United States Patent
Sano et al.

[11] Patent Number: 5,922,115
[45] Date of Patent: Jul. 13, 1999

[54] DECOLORIZABLE INK AND PRINTER

[75] Inventors: Kenji Sano; Katsuyuki Naito, both of Tokyo; Satoshi Takayama, Kawasaki; Sawako Fujioka, Tokyo; Tetsuo Okuyama, Yokohama, all of Japan

[73] Assignee: Kabushiki Kaisha Toshiba, Kawasaki, Japan

[21] Appl. No.: 08/900,708

[22] Filed: Jul. 25, 1997

[30] Foreign Application Priority Data

Jul. 25, 1996 [JP] Japan ................................. 8-196191

[51] Int. Cl.⁶ ............................................... C09D 11/00
[52] U.S. Cl. ........................... 106/31.32; 106/31.23; 106/31.64
[58] Field of Search ............................... 106/31.32

[56] References Cited

U.S. PATENT DOCUMENTS 4,845,071  7/1989  Shimomura et al. ................ 503/205
5,663,115  9/1997  Naito et al. ........................... 503/201

FOREIGN PATENT DOCUMENTS

2-188294  7/1990  Japan .
4-247984  9/1992  Japan .
7-81236   3/1995  Japan .

Primary Examiner—Mark L. Bell
Assistant Examiner—Veronica Faison
Attorney, Agent, or Firm—Oblon, Spivak, McClelland, Maier & Neustadt, P.C.

[57] ABSTRACT

Decolorizable ink consisting of an ink composition dispersed in a solvent, the ink composition comprising a color former, a developer and a decolorizer, wherein the color former and developer are in a colored state by interaction between them and the decolorizer has a property to dissolve preferentially the developer when the ink composition is melted.

6 Claims, 8 Drawing Sheets

FIG. 13

DECOLORIZABLE INK AND PRINTER

BACKGROUND OF THE INVENTION

The present invention relates to decolorizable ink which can be decolored after it is printed and a printer using the ink.

In recent years, the amount of various kinds of information has significantly increased by spread of office automation, and so the level of information output has also increased. The information output is represented by display output and hard copy output from a printer onto paper sheets. The display output, however, requires a large scale circuit board in a display unit. This brings about problems of portability and cost. Regarding the hard copy output, a large quantity of paper as a recording medium is being consumed with increase in the information output amount. Therefore, the hard copy output is expected to be a problem with respect to conservation of natural resources. In addition, recycling of paper sheets once printed by a printer or a copying machine is expensive, since much of a bleaching agent and water are required for the recycling. Under such a situation, it is considered to decrease consumption of paper substantially by using decolorizable ink to print information on a paper sheet, restoring a blank sheet of paper by decoloring the ink, and reusing the paper sheet.

Heretofore, ink which can be decolored on heating has been proposed in, for example, Published Unexamined Japanese Patent Application No. 7-81236. The ink includes a color former such as a leuco dye, a developer, and a organophosphoric compound having a decoloring power.

When such ink is used, however, decoloring can be done insufficiently and, as a result, a paper sheet is hard to return to the blank state. For this reason, decolorizable ink cannot have been put into practical use.

BRIEF SUMMARY OF THE INVENTION

It is, accordingly, an object of the present invention to provide ink which can give print having a sufficient contrast and can be decolored by heating, thereby making it possible to recycle paper sheets. It is another object of the present invention to provide a printer using the ink.

Decolorizable ink of the present invention comprises an ink composition dispersed in a solvent, the ink composition including a color former, a developer and a decolorizer, wherein the color former and the developer are in a colored state by interaction between them and the decolorizer has a property to dissolve preferentially one of the color former and the developer when the ink composition is melted.

A method of printing with ink and decoloring the ink of the present invention comprises steps of preparing a printing sheet consisting of a sheet substrate on which an ink composition including a color former and a developer is applied, and thermally transferring the ink composition to a medium, thereby printing information on the medium with the ink composition, and preparing a decoloring sheet consisting of another sheet substrate on which a composition including a decolorizer is applied, and thermally transferring the composition including the decolorizer to the printed medium, thereby decoloring the ink composition.

A printer of the present invention comprises a printing mechanism to print a medium with the above mentioned decolorizable ink and a printing mechanism to print a medium with a normal ink.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in detail below.

Decolorizable ink of the present invention uses a color former and a developer in combination with a decolorizer to enable decoloring of a printed medium.

First, functions of basic components used in the decolorizable ink of the present invention will be described. A color former is a precursor compound of a coloring matter which forms colored information such as characters and graphics, a developer is a compound which develops a color former by the interaction (primarily, exchange of an electron or proton) between the developer and the color former, and a decolorizer is a compound having a property that preferentially dissolves one of the color former and the developer when they are melted.

When the three-component system is in a solidified state, it is possible for the system to assume one of the following two particular states:

(1) A colored state in which the decolorizer is mixed with the color former and the developer in an amount that corresponds to the equilibrium solubility, and the excessive color former and developer over the equilibrium solubility are phase-separated from the decolorizer, with the result that the interaction between the color former and the developer is increased to develop a color.

(2) A decolored state in which the decolorizer dissolves a larger amount of the color former and the developer than the equilibrium solubility, with the result that the interaction between the color former and the developer is decreased to lose the color.

Changes between colored and decolored states of the three-component system are effected in accordance with a principle described below. It is assumed in the following description that, when the above mentioned three-component system is melted into a fluidized condition, the decolorizer preferentially dissolves the developer. At room temperature, a condition in which a phase of the color former and the developer is separated from a phase of the decolorizer is close to equilibrium. In this condition, the system is in a colored state, since the color former and the developer interact with each other. When the three-component system in the colored state is heated up to the melting point or higher to be a fluidized condition, the developer is preferentially dissolved into the decolorizer. As a result, the interaction between the developer and the color former is lost, leading to decoloring. When the three-component system is forcedly solidified by cooling rapidly from the molten state, the decolorizer takes the developer into itself in a large amount exceeding the equilibrium solubility. As a result, the system is turned amorphous and colorless at room temperature. Although the amorphous three-component system is under a non-equilibrium state in a relative sense, the amorphous system exhibits a sufficiently long life at temperatures not higher than a glass transition point Tg. Therefore, if Tg is not lower than room temperature, the system does not easily converted from the amorphous state to the equilibrium state.

Next, compounds used as components of the ink of the present invention are described below.

The color former used in the present invention includes electron-donating organic substances such as leucoauramines, diarylphtalides, polyarylcarbinoles, acylauramines, arylauramines, Rohdamine B lactams, indolines, spiropyrans and fluorans.

To be more specific, the color former includes Crystal Violet lactone (CVL), Malakite Green lactone, 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)fluoran, 2-chloro-6-(diethylamino)fluoran, 7-(N,N-diethylamino)-3-(N,N-diethylamino)fluoran, 3, 6-bis(diethylamino)fluoran, γ-(4'-nitroanilino)lactam, 3-diethylaminobenzo[a]-fluoran, 3-dietylamino-6-methyl-7-aminofluoran, 3-diethylamino-7-xylidino-fluoran, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl) phthalide, 3-diethylamino-7-chloroanilinofluoran, 3-diethylamino-7, 8-benzofluoran, 3,3-bis(1-n-butyl-2-methylindole-3-yl)phthalide, 3,6-dimethylethoxyfluoran, 3,6-diethylamino-6-methoxy-7-aminofluoran, DEPM, ATP, ETAC, 2-(2-chloroanilino)-6-dibutylaminofluoran, Crystal Violet carbinol, Malachite Green carbinol, N-(2,3-dichlorophenyl)leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethylamino-6-benzyloxyfluoran, 1,2-benzo-6-diethyaminofluoran, 3,6-di-p-toluidino-4,5-dimetylfluoran, phenylhydrazide-γ-lactam, and 3-amino-5-methylfluoran. The color former compounds exemplified above can be used singly or in a combination of two or more species. If color formers are selected properly, a variety of colored states can be obtained, and thus multicolor printing can be attained.

The developer used in the present invention includes acidic compounds, such as phenols, metal phenolates, metal carboxylates, benzophenones, sulfonic acids, sulfonates, phosphoric acids, metal phosphates, acidic phosphoric esters, acidic phosphoric ester metal salts, phosphrous acids, and metal phosphites. The developer compounds can be used singly or in a combination of two or more species.

The decolorizer used in the present invention should desirably have a good colorlessness in an amorphous state. If the decolorizer is more colorless and transparent in the amorphous state, a recycled paper sheet is turned white closer to the original paper sheet when the ink on the paper sheet is decolored. The decolorizer shows such characteristics should preferably have a high molecular weight and a small enthalpy change of melting ΔH of the crystal per weight and, thus, should be low in maximum crystallization velocity (MCV). If the crystal of decolorizer has a small enthalpy change of melting ΔH, the heat energy required for melting the crystal is decreased, which is desirable in regard to energy saving. From the above considerations, it is desirable to use as the decolorizer a compound having a bulky molecular skeleton close to a spherical form such as a steroid skeleton. In order to increase solubility of the developer in the decolorizer, it is desirable that the decolorizer has a high affinity with the developer. Therefore, the decolorizer should desirably be a compound having, for example, an alcoholic hydroxyl group. From a view point of a storage stability of the three-component system in a decolored state, a glass transition point Tg of the three-component system should be not lower than room temperature (25° C.), and preferably be not lower than 50° C. In order to satisfy the above condition, the glass transition point Tg of the decolorizer should also be not lower than room temperature (25° C.), and preferably be not lower than 50° C. On the other hand, the crystallization temperature of a decolorizer is in the range of the glass transition point Tg to the melting point Tm of the three-component system. Therefore, in order to accelerate decoloring, the glass transition point Tg of a decolorizer should preferably be not higher than 150° C.

As a preferable decolorizer that satisfies above conditions, the following compounds classified in the groups (a) to (c) are enumerated.

(a) Sterol compounds: Specific examples are choresterol, stigmasterol, pregnenolone, methylandrostenediol, estradiol benzoate, epiandrostene, stenolone, β-sitosterol, pregnenolone acetate, β-chorestanol, 5,16-pregnadiene-3β-ol-20-one, 5α-pregnen-3β-ol-20-one, 5-pregnen-3β, 17-diol-20-one 21-acetate, 5-pregnen-3β, 17-diol-20-one 17-acetate, 5-pregnen-3β, 21-diol-20-one 21-acetate, 5-pregnen-3β, 17-diol diacetate, rockogenin, thigogenin, esmiragenin, heckogenin, diosgenin and their derivatives. These decolorizers can be used singly or in a combination of two or more species. Particularly preferable decolorizer which can give a stable decolored state includes methylandrostenediol, heckogenin, rockogenin, thigogenin, diosgenin and esmiragenin.

When a three-component system containing the decolorizer selected from the above group in an amorphous state is heated to a temperature higher than a glass transition point, a diffusion velocity of a developer is rapidly increased and a motion of phase separation between the developer and the decolorizer is accelerated in a direction of returning to a equilibrium. If the three-component system heated to a temperature higher than the crystallizing temperature and lower than the melting point is then slowly cooled down to room temperature, the system reaches to a stable phase separated state closer to a equilibrium, at which the system returns to a colored state. Therefore, the three-component system including the decolorizer of the (a) group can repeat reversible changes between colored and decolored states. In this sense, the decolorizer classified in the (a) group is sometimes referred to, hereinafter, as a "reversible decolorizer". A rewritable recording medium which utilizes such reversible changes has been proposed. However, the present invention has an object to provide decolorizable ink whose color is removed after printed, and therefore the reversibility between colored and decolored states is not substantially required in the present invention with the exception of some special applications.

(b) Cholic acid, lithocholic acid, testosterone, cortisone and their derivatives: Specific examples are cholic acid, methyl cholate, lithocholic acid, methyl lithocholate, hydroxycholic acid, methyl hydroxycholate, testosterone, methyltestosterone, 11α-hydroxymethyltestosterone, and hydrocortisone. Among them, compounds having two or more hydroxyl groups are especially preferred.

The decolorizer of the (b) group, compared to that of the (a) group, has a stronger affinity to the developer when they are melted, in other words, has a very high compatibility thereto. In addition, the decolorizer of the (b) group has a higher inclination of being amorphous, and therefore a phase separation is hard to occur even after the three-component system is solidified. In this sense, the decolorizer classified in the (b) group is sometimes referred to as a "compatible decolorizer" hereinafter. For this reason, the three-component system including the decolorizer of the (b) group can maintain a stabler decolored state.

(c) Non-aromatic cyclic compounds of a five-membered or larger ring having one or more hydroxyl groups: The decolorizer of the (c) group should have a melting point of 50° C. or higher. Specific examples are alicyclic monohydric alcohols such as cyclododecanol; alicyclic dihydric alcohols such as 1,4-cyclohexandiol, 1,2-cyclohexandiol and 1,2-cyclododecandiol; saccharides and their derivatives such as glucose and saccharose; alcohols having a ring structure such as 1,2:5,6-diisopropylidene-D-mannitol.

The decolorizer of the (c) group functions effectively when it is used together with the decolorizer of the (a) group, although it may be used singly. That is, the decolorizer of the (c) group has a strong affinity with the decolorizer of the (a) group, and therefore a phase separation is hard to occur even after the system is solidified. In this sense, the decolorizer of the (c) group is sometimes referred to as a "phase separation inhibiting decolorizer" or "phase separation inhibitor" hereinafter. The system including the decolorizer of the (c) group can also maintain a stabler decolored state.

Embodiments of the decolorizable ink of the present invention and a method of using the same will be described below.

In one embodiment of the decolorizable ink of the present invention, an ink composition comprising a color former, a developer and a decolorizer that is in a colored state is dispersed in a solvent. Preferable mixing ratio of the color former, the developer and the decolorizer is as follows. It is desirable to use the developer in an amount of 0.1 to 10 parts by weight, preferably 1 to 2 parts by weight, relative to 1 part by weight of the color former. If the amount of the developer is smaller than 0.1 parts by weight, coloring of the ink by the interaction between the color former and the developer becomes insufficient. If the amount of the developer exceeds 10 parts by weight, it becomes difficult to decrease sufficiently the interaction between these compounds. It is desirable to use the decolorizer in an amount of 1 to 200 parts by weight, preferably 10 to 100 parts by weight, relative to 1 part by weight of the color former. If the amount of the decolorizer is smaller than 1 part by weight, changes between the colored and decolored states cannot occur easily. If the amount of decolorizer exceeds 200 parts by weight, coloring of the ink becomes insufficient.

A solvent used in the decolorizable ink of the present invention is preferably water. Although the ink composition may be dispersed in the solvent by the help of a surfactant, it is preferred that microcapsules having a structure in which the ink composition is covered by a polymer shell are dispersed in the solvent. In order to improve weather resistance and ultraviolet resistance, it is preferable to add a ultraviolet absorber to the ink composition contained in the microcapsules or to use a ultraviolet absorbing polymer as a shell material of microcapsule. In preparing microcapsules, it is desirable to use the polymer in an amount of 0.01 to 100 parts by weight, preferably 0.1 to 5% parts by weight, relative to 1 part by weight of the decolorizer.

The concentration of the ink composition in the solvent is preferably in the range of 0.1 to 10 wt %, although the concentration varies depending on purposes. If the concentration is smaller than 0.1 wt %, sufficient print density cannot be obtained. If the concentration exceeds 10 wt %, the viscosity of the ink becomes too high to use, for example, as ink for a ink-jet printer. The ink composition dispersed in the solvent should preferably be in the form of particles of sub-micron in size not including particles of 10 μm or more.

The decolorizable ink of the present invention can be used as ink for ball-point pens and fountain pens, a printer ink for an ink-jet printer, and printing ink for screen printing and typographic printing on various kinds of paper. Moreover, the decolorizable ink is used for printing on a sheet for a overhead projector. The ink can be easily decolored by simply heating after it is printed. That is, since the ink contains the decolorizer that preferentially dissolves one of the color former and the developer, the color of the ink can be almost completely removed by suppressing the interaction between the color former and the developer when the ink is melted and then solidified. Therefore, a paper sheet with a blank surface can be restored. There are no needs for a bleaching agent and water for recycling of paper, and therefore recycling cost is decreased. At the same time, decrease in paper consumption contributes to conservation of forest resources.

The decolorizable ink of the present invention can be applied to uses in which decoloring of ink is simply required without reusing paper sheets. For example, the ink is applicable to processing post cards in post offices, wherein the addresses handwritten on post cards are read with an image reader to obtain bar code corresponding to the reading in a post office, bars are then printed on the post cards with the ink of the present invention, the post cards are classified with a machine according to the bar code, the classified post cards are sent to another post offices, the post cards are sorted in order of postal delivery in each post office, and then the bars are decolored by heating. In such a manner, post cards can be delivered without any trace of the processing in the post offices. In a manner similar to this, the decolorizable ink of the present invention can generally be used for physical distribution. In this purpose, substances other than paper may be printed.

Next, an apparatus used for decoloring the decolorizable ink of the present invention and an ink-jet printer using the decolorizable ink are described below.

An apparatus used for decoloring the decolorizable ink of the present invention to recycle paper sheets may be in any form, as long as the apparatus has a mechanism capable of heating and rapid cooling a paper sheet. A specific example of such an apparatus is a thermal head having a heating resistor. A thermal bar, which is one kind of thermal head, having a heating resistor capable of heating the paper sheet across a large area can be used. In this case, a heating area on a paper sheet may be adjusted by controlling current in the thermal bar so as to decolor only a desired area of the paper sheet. If a heating apparatus such as a heat roller is used, a large quantity of printed paper can be decolored for recycling. In the case where printing on the surface of an article not having sheet-like form is to be decolored, the surface of the article is heated with an infrared lamp or by hot air and then rapidly cooled by cold air or with a heat sink having a large heat capacity.

Figure 1:
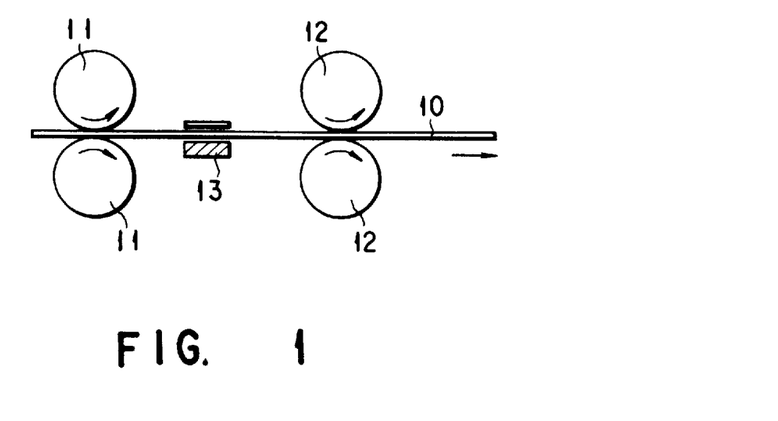
FIG. 1 is a schematic view of a mechanism for decoloring the decolorizable ink of the present invention.
Figure 2:
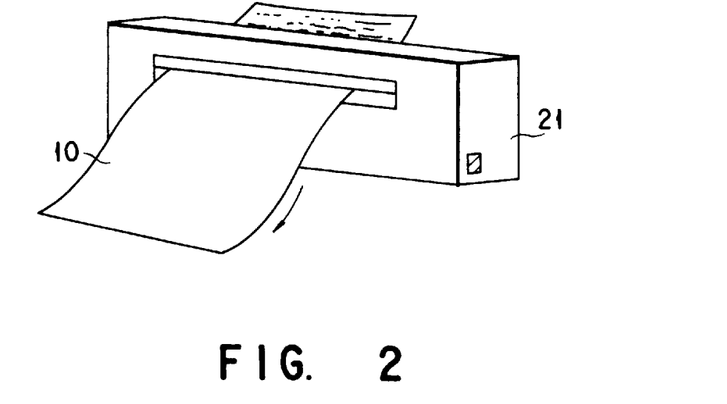
FIG. 2 is a perspective view of an apparatus for decoloring the decolorizable ink of the present invention.

For example, as shown in FIG. 1, a thermal bar 13 whose heating area is adjusted to a proper area is located between a pair of feed rollers 11, 11 and a pair of transport rollers 12, 12, and a paper sheet 10 already printed with the decolorizable ink of the present invention is passed through the thermal bar 13. When electric current is made to flow through the thermal bar 13, heating up to 300° C. can be effected instantly. The paper sheet 10 is heated with the thermal bar 13, and then comes out of the apparatus to be cooled rapidly, so that the print on the paper sheet can be decolored. FIG. 2 shows a decoloring apparatus (recycling apparatus) 21 of a hand-feed type which incorporates the decoloring mechanism of FIG. 1.

Figure 3:
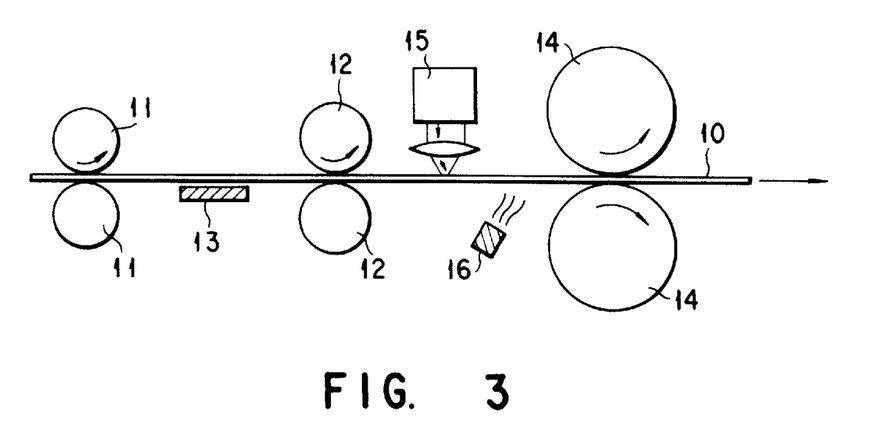
FIG. 3 is a schematic view of another mechanism for decoloring the decolorizable ink of the present invention.

FIG. 3 shows a mechanism with which decoloring of print on a paper sheet and recycling of the paper sheet can be carried out in a more reliable manner than that in the mechanism of FIG. 1. As shown in FIG. 3, in addition to the mechanism of FIG. 1, a pair of pressing rollers 14, 14 is disposed to smooth wrinkles on the paper sheet, and also a UV source 15 and a humidifier 16 are disposed between the transport rollers 12, 12 and the pressing rollers 14, 14. In this mechanism, the coloring matter is decomposed completely to be colorless on exposure by radiation from the UV source 15, the wrinkles on the paper sheet 10 can effectively be smoothed by the pressing rollers 14, 14 after proper humidity is given by the humidifier 16. When such a mechanism is used, the number of repeating use of the same paper sheet can be increased. Degradation of the paper sheet does not become a problem, if a high-grade paper sheet such as plastic-coated paper is used for a special purpose.

A printer using the decolorizable ink of the present invention is most preferably an ink-jet printer. When ink containing a reversible decolorizer is used, it is especially preferable to use an ink-jet printer that injects ink without any heating. Accordingly, the most preferable means for injecting the ink is one that uses vibration of a piezoelectric element or supersonic waves. If ink containing a decolorizer of the (b) group and the (c) group or ink containing components all having high Tgs is used, a bubble-jet printer in which ink is heated may be used.

Figure 4A:
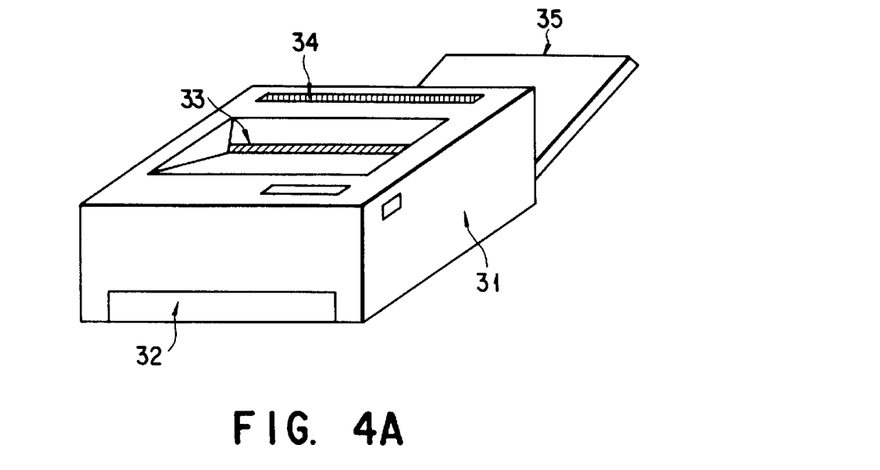
FIG. 4A is a perspective view of an ink-jet printer of the present invention.
Figure 4B:
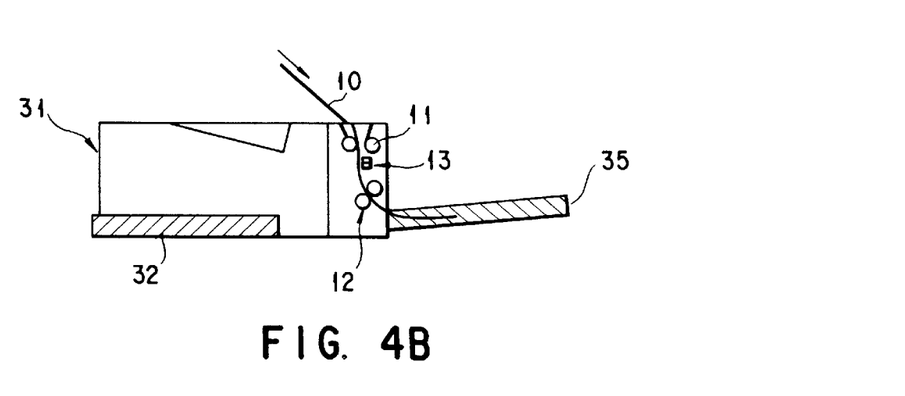
FIG. 4B is a schematic view of a decoloring mechanism used in the printer.

FIGS. 4A and 4B show an ink-jet printer having the decoloring mechanism of FIG. 1. In this printer 31, paper sheets to be printed are stored in the feed tray 32. A paper sheet is printed by way of a printing mechanism similar to that of a common ink-jet printer and finally comes out from the outlet 33. Upon recycling, a printed paper sheet 10 is inserted through the inlet 34, the paper sheet 10 travels through the decoloring mechanism equipped with the feed rollers 11, transport rollers 12 and the thermal bar 13 as shown in FIG. 1, and finally the paper sheet 10 is received into the recovery tray 35. In this case, the printing tray 32 and the recovery tray 35 are in the same shape so as to be exchangeable.

Figure 5:
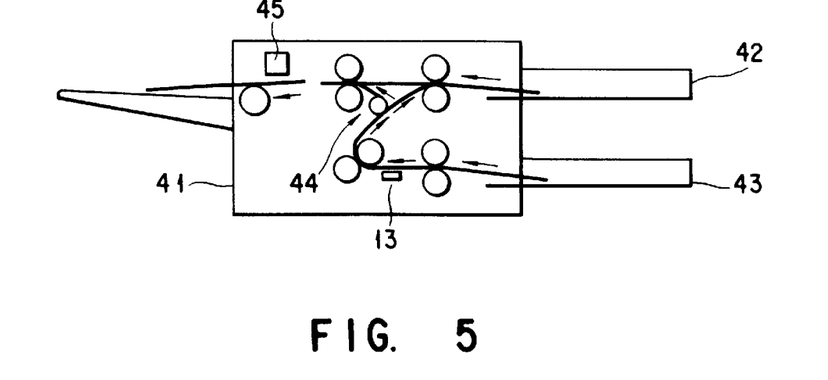
FIG. 5 is a schematic view of another ink-jet printer of the present invention.

FIG. 5 shows an ink-jet printer capable of printing on both new paper sheets and printed paper sheets. In this printer 41, trays 42, 43 for respectively accommodating new and printed paper sheets are mounted on a side of the printer 41. The tray 42 is also used as a tray for recovering recycled paper after the printed information on the printed paper is decolored. A new paper sheet is fed from the tray 42, printed with a printer head 45 while passing through a printing mechanism of a common ink-jet printer, and then discharged. On the other hand, a printed paper sheet is fed from the tray 43, decolored with the thermal bar 13, and then recovered in the tray 42 or fed again toward the printer head 45 so as to be printed and then discharged. Switching between both transport courses is conducted by a switching mechanism 44.

Figure 6:
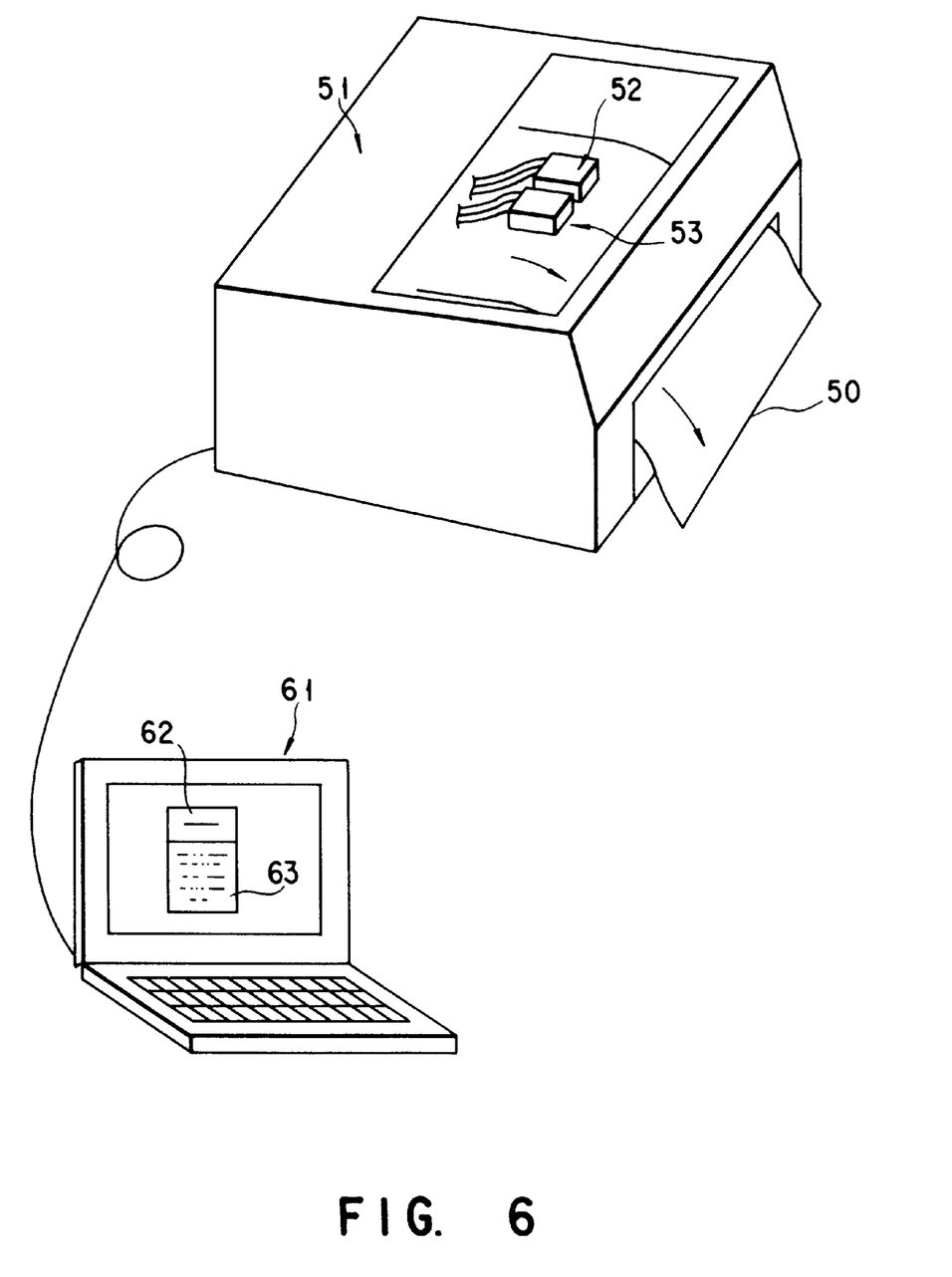
FIG. 6 is a perspective view of still another ink-jet printer of the present invention.

FIG. 6 shows an ink-jet printer having a head for printing with the decolorizable ink of the present invention and another head for printing with a normal ink. In this printer 51, the head 52 for printing with the decolorizable ink and the head 53 for printing with the normal ink are equipped. Printing information is instructed to the printer 51 from an application software executed on the computer 61. An image of a paper sheet to be printed is displayed on the computer display. Input to a fixed information region 62 and a variable information region 63 is conducted on the display. In the printer 51, both heads 52 and 53 for the decolorizable ink and the normal ink are actuated according to the instructions from the application software, thereby carrying out printing on a paper sheet 50 as instructed. With this type of printer, only variable information possibly be rewritten can be repeatedly decolored and printed again many times.

Figure 7:
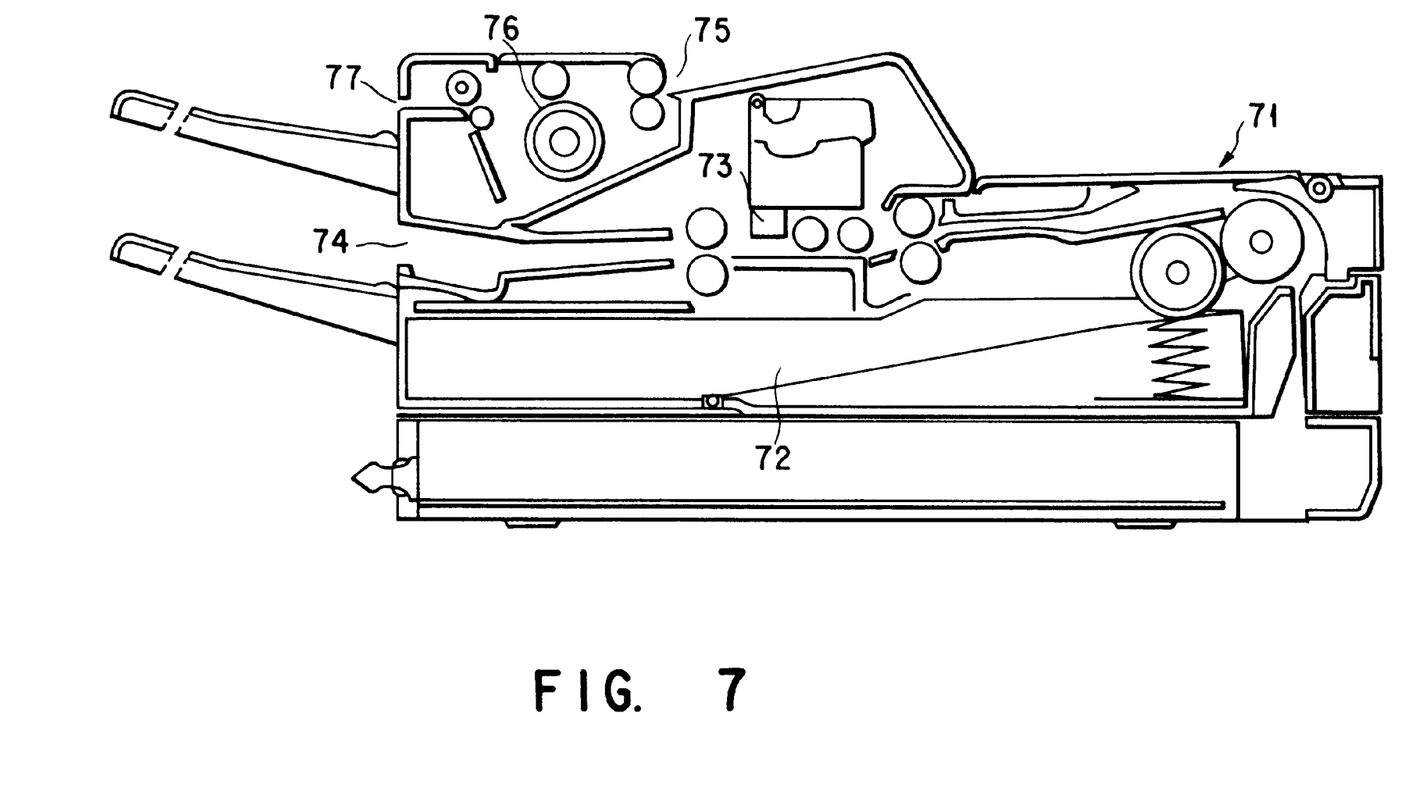
FIG. 7 is a view illustrating a structure of still another ink-jet printer.

FIG. 7 shows an ink-jet printer having a decoloring mechanism consisting of a heat roller. In this printer 71, paper sheets placed in the cassette 72 in the bottom are fed by a transport roller, printed by the printer head 73 and discharged through the outlet 74. When a printed paper is recycled, the printed paper sheet is fed through the inlet 75, decolored by heating with the heat roller 76, and then discharged through another outlet 77.

In the present invention, toner for electrophotographic prepared by pulverizing a composition containing a color former, a developer, a decolorizer and a binder may be used to decolor a printed paper sheet. In the electrophotographic application, toner transferred on the paper sheet is fixed by heating, and therefore it is preferable to use a compatible or phase-separation inhibiting decolorizer.

Figure 8:
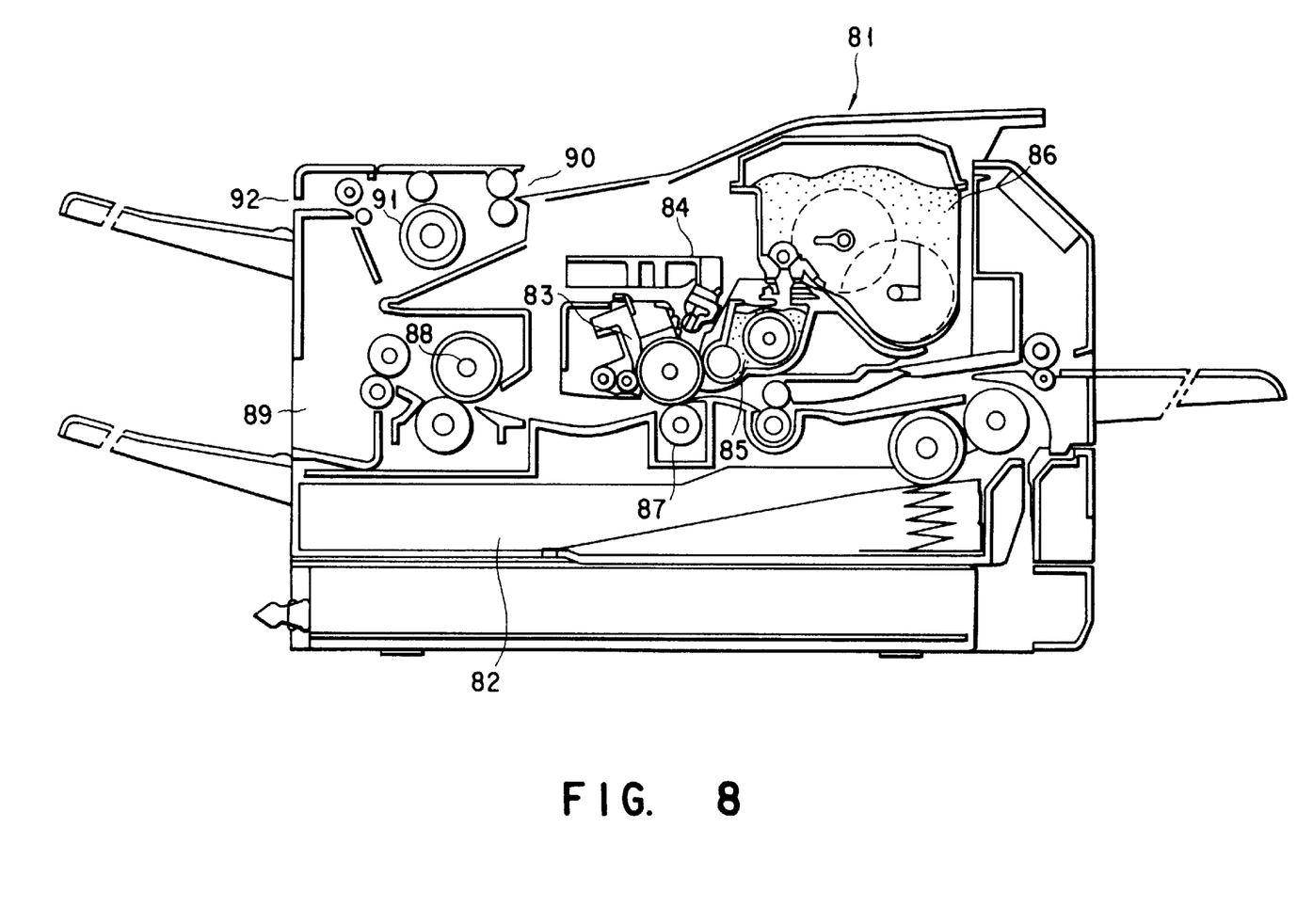
FIG. 8 is a view illustrating a structure of a copy machine of electrophotographic type of the present invention.

FIG. 8 shows a copy machine of electrophotographic type having a decoloring mechanism consisting of a heat roller. In this copy machine 81, paper sheet are accommodated in the cassette 82 in the bottom. The photosensitive drum 83 locating in the central portion of the machine is irradiated with light from the LED head 84, thereby forming a latent image on the surface of the drum 83. To the drum 83, charged toner 86 is attached with the developing apparatus 85 by an electrostatic force to form a toner image. A paper sheet is, in a timely manner with the development, transported between the drum 83 and the transfer roller 87, thereby transferring the toner to the paper sheet. The toner transferred on the paper sheet is fixed by the fixing roller 88 and then discharged through the outlet 89. When a printed paper sheet is recycled, the paper sheet is fed through the inlet 90, heated by a heat roller 91 to decolor and then discharged through the outlet 92. Temperatures of the fixing roller 88 and the heat roller 91 are so set, for example, 140° C. and 190° C., that the temperature of the heat roller 91 is higher than that of the fixing roller 88.

In the copy machine of electrophotographic type, printing toner comprising a color former and a developer and decoloring toner comprising a decolorizer may be used.

Components of the ink of the present invention can be applicable to a thermal printer. In this case, a sheet (or ribbon) for printing and a sheet (or ribbon) for decoloring are preferably used to effect printing and decoloring. The sheet or ribbon is made of a heat-resistant resin such as polyethyleneterephthalate (PET).

For example, an ink composition comprising a color former and a developer is applied on a sheet substrate to prepare a printing sheet. The ink composition may be applied together with wax in order to facilitate transfer to the paper. Another composition including a decolorizer is applied on another sheet substrate to prepare a decoloring sheet. Using a thermal printer, the ink composition on the printing sheet is thermally transferred to a paper sheet to effect printing and, when necessary, the composition including the decolorizer on the decoloring sheet is thermally transferred to the printed paper sheet to effect decoloring. As to the decolorizer, those categorized in the compatible decolorizer or the phase-separation inhibiting decolorizer are preferred. In the decoloring operation, a power of the thermal printer head is raised so as to operate at a higher temperature as compared with that in the printing operation.

Figure 9A:
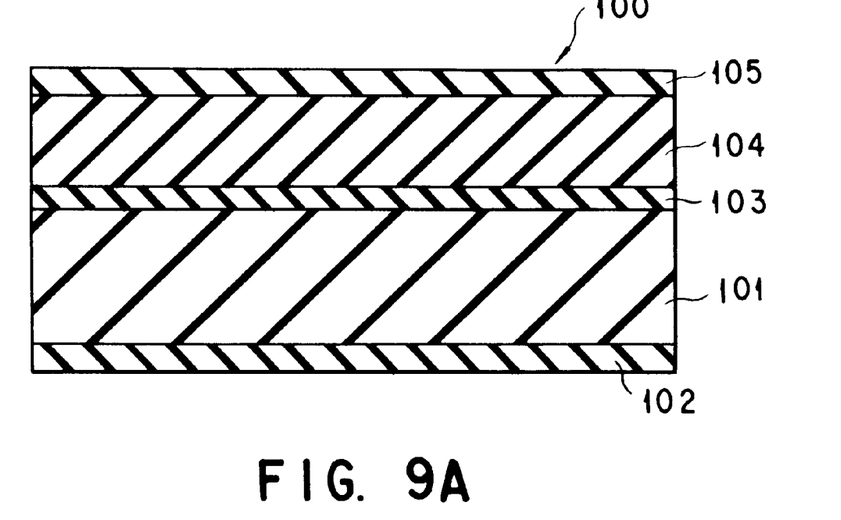
FIG. 9A is a sectional view of a sheet on which an ink of the present invention is applied.
Figure 9B:
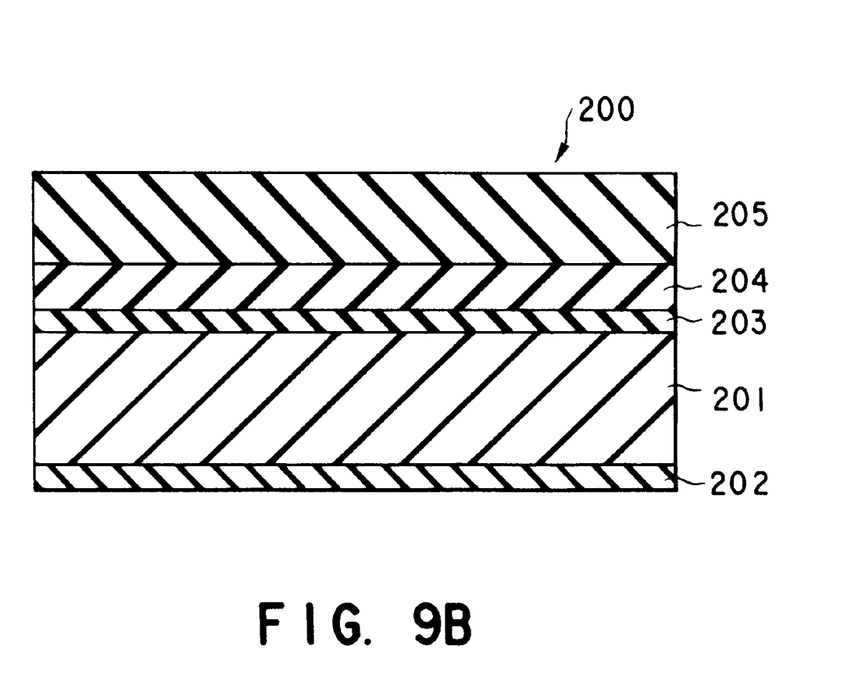
FIG. 9B is a sectional view of a sheet on which a decolorizer of the present invention is applied.

FIG. 9A shows an example of a printing sheet, and FIG. 9B shows an example of a decoloring sheet. The printing sheet 100 in FIG. 9A has a structure that the release layer 103, the ink layer 104 and the lubricant layer 105 are formed on the PET sheet 101 on the back of which the back coating layer 102 is formed. Note that, the release layer 103 and the lubricant layer 105 are not necessarily required. The decoloring sheet 200 in FIG. 9B has a structure that the release layer 203, the barrier layer 204 and the decolorizer layer 205 are formed on the PET sheet 201 on the back of which the back coating layer 202 is formed. With the barrier layer 204 inserted, the decolorizer can be prevented from spreading wide over a medium. Note that, the release layer 203 and the barrier layer 204 are not necessarily required.

In the above case, it may be used an ink composition in colored state which comprises a color former, a developer and a decolorizer having a relatively low glass transition point. When the ink composition is thermally transferred to a paper sheet and the printed paper sheet is temporarily decolored by heating and then the paper sheet is left at room temperature, the decolored printing can be restored to be visible. Such a function is applicable, for example, to judgment of storage conditions of fresh foods to be refrigerated. That is, if a label on which warning is printed with the above ink composition is attached on the package of fresh foods and then the label is decolored, the warning appears on the label when the package is left at room temperature.

In addition, when it is desired that an ink composition has a reversibility, a phase-separation accelerator, which is a compound that accelerates phase separation of a color former and a developer from a decolorizer, may be added in order to raise a coloring speed. Preferred phase-separation accelerator is a low molecular weight organic compound, which is highly crystallizable, having a long chain alkyl group with eight or more carbon atoms and a polar group such as OH, CO and COOH. Examples of phase-separation accelerator are linear higher monohydric alcohols, linear higher polyhydric alcohols, linear higher fatty acids, linear higher polyvalent fatty acids, esters and ethers thereof, linear higher fatty acid amides and linear higher polyvalent fatty acid amides.

To be more specific, the phase-separation accelerator includes: linear higher monohydric alcohols such as 1-docosanol, 1-tetracosanol, 1-hexacosanol and 1-octacosanol; linear higher polyhydric alcohols such as 1,12-dodecanediol, 1,12-octadecanediol, 1,2-tetradecanediol and 1,2-hexadecanediol; linear higher fatty acids such as behenic acid, 1-docosanic acid, 1-tetracosanic acid, 1-hexacosanic acid and 1-octacosanic acid; linear higher polyhydric fatty acids such as dodecanedioic acid and 1,12-dodecanedicarboxylic acid; linear higher ketons such as stearone; linear higher fatty acid alcohol amides such as isopropanolamide stearate, isopropanolamide behenate and hexanolamide behenate; and linear higher fatty acid dioldiesters such as ethyleneglycol dilaurate, catechol dilaurate and cyclohexanediol dilaurate. These compounds can be used singly or in combination of two or more species. Examples of a mixture which can be used as the phase-separation accelerator are ester-base waxes, alcohol-base waxes and urethane-base waxes.

Combinations of components applied on a printing sheet and a decoloring sheet are modified from the above mentioned combinations. For example, a printing sheet applied with an ink composition comprising a color former, a developer and a phase-separation inhibiting decolorizer (or a compatible decolorizer) and a decoloring sheet applied with a composition including a reversible decolorizer may be used. Further, only a printing sheet applied with an ink composition comprising a color former, a developer, a reversible decolorizer and a phase-separation inhibiting decolorizer (or compatible decolorizer) in a state where the reversible decolorizer and the phase-separation inhibiting decolorizer (or compatible decolorizer) are phase-separated may be used.

In the present invention, two kinds of printing method may be used together. For example, a paper sheet is printed with toner including a color former and a developer by electrophotography and then a decolorizer may be thermally transferred from a decoloring sheet to the printed paper sheet for decoloring.

Further, printing and decoloring may be carried out in the following manner. Upon printing, first toner including a color former and a developer is transferred on a heat-resistant sheet by electrophotography, and then the first toner on the heat-resistant sheet is thermally transferred to a paper sheet. Upon decoloring, second toner including a decolorizer is transferred on a heat-resistant sheet by electrophotography, and then the second toner on the heat-resistant sheet is thermally transferred to the printed paper sheet. In this case, too, decoloring is carried out at a higher temperature than printing. In this method, partial correction can be made in a printed region. In normal electrophotography, since a paper sheet is entirely heated in the fixing process, if a part of printed paper sheet is decolored and subsequently re-printed and then a different part of the re-printed paper is decolored, the re-printed part is likely to be decolored in the fixing process. On the contrary, in the above method, correction can be repeated two or more times, since there is no need for the fixing process.

EXAMPLES

Examples of the present invention will be described below.

Example 1

One part by weight of Crystal Violet lactone (CVL) as a color former, two parts by weight of 2,4,4'-trihydroxybenzophenone as a developer and 10 parts by weight of methylandrostenediol as a decolorizer were homogeneously mixed in a mixture solvent of toluene and cyclohexane, and then the solvent was evaporated off to obtain powder. After the powder was heated up to 150° C., it was cooled down to room temperature in 10 minutes to develop blue color. One gram of the powder was put into 50 cc of water added with 0.5 grams of sodium stearate as surfactant, and the ink composition powder was pulverized to a particle size of a micron order in a pulverizer to prepare ink with dispersed fine powder therein.

Using the ink thus prepared, characters were written on a paper sheet of A4 size with pen. After drying, a thermal bar set at 200° C. was passed above the paper sheet in two seconds. As a result, the characters completely disappeared and a blank paper sheet was obtained. When writing and decoloring were repeated 30 times, also a blank paper sheet was finally obtained. The optical density (OD) of the blank paper sheet finally obtained was 0.15.

Example 2

One part by weight of ETAC as a color former, one part by weight of 2,4,4'-trihydroxybenzophenone as a developer, five parts by weight of heckogenin as a decolorizer were homogeneously mixed in a mixture solvent of toluene and cyclohexane, and then the solvent was evaporated off to obtain powder. After the powder was heated up to 150° C., it was cooled down to room temperature in 10 minutes to develop blue color. One gram of the powder was put into 50 cc of water added with 0.5 grams of sodium stearate as surfactant, and the ink composition powder was pulverized to a particle size of a micron order in a pulverizer to prepare ink with dispersed fine powder therein.

The ink was used in an ink-jet printer equipped with a piezoelectric element (MJ800C manufactured by Epson Co.), and printing was carried out on a paper sheet of A4 size. After the printing, a thermal bar was passed above the paper sheet to decolor the printed information. When the recycled paper was stored at 60° C. for 30 hours, the printed information did not appear again, which revealed that the recycled paper sheet had a good storage stability. After the paper sheet was printed again, the printed surface was irradiated with light at 5000 lux for 300 hours. In this case, decrease in printing density was not higher than 10%.

Example 3

One part by weight of PSD-HR (available from Nippon Soda Co. Ltd.) as a color former, one part by weight of α, α, α'-tris(4-hydroxyphenyl)-1-ethyl-4-isoproylbenzene as a developer and 20 parts by weight of pregnenolone as a decolorizer were melted to form a mixture, and then the mixture was gradually cooled to obtain a red solid product. The product dissolved in an aqueous solution containing 8 wt % of gum arabic was pulverized with a ball mill to a particle size of the order of 10 μm so that the powder was dispersed in the aqueous solution. The dispersed product was mixed with an aqueous solution of gelatin at 40° C., the mixture was stirred for 1 hours, and then water was added dropwise while stirring to dilute the mixture. Next, an aqueous solution containing 10 wt % of acetic acid was added to adjust pH of the mixture to be 3.9, and then 37% formalin was added to adjust pH of the mixture to be 7.0. The liquid thus prepared was cooled to 5° C., left at room temperature for 3 days, and then the liquid was subjected to a centrifugal separator to separate microcapsules. In this way, microcapsules for red color were prepared. The microcapsules were dispersed in water at a concentration of 8 wt % to prepare ink.

The ink was used in a ink-jet printer equipped with a piezoelectric element (MJ800C, manufactured by Epson Corp.), and printing was carried out on a paper sheet of A4 size. After the printing, a thermal bar was passed above the paper sheet to decolor the printed information. When the recycled paper was stored at 60° C. for 30 hours, the printed information did not appear again, which revealed that the recycled paper sheet had a good storage stability. After the paper sheet was printed again, the printed surface was irradiated with light at 5000 lux for 300 hours. In this case, decrease in printing density was not higher than 10%.

Example 4

Microcapsules obtained in a similar method to that of the example 3 was dispersed in water at a concentration of 15 wt % to prepare ink for typographic printing.

A paper sheet of A4 size was printed with this ink in a common typographic printing process. Thereafter, a heat roller kept at 200° C. was made to contact with the sheet for two seconds to decolor the printed information. When printing and decoloring were repeated 30 times, also a blank paper sheet was finally obtained. The optical density (OD) of the blank paper sheet finally obtained was 0.15.

Example 5

Microcapsules were prepared in a similar method to that the example 3 except that one part by weight of Crystal Violet lactone (CVL) as a color former, two parts by weight of 2,4,4'-trihydroxybenzophenone as a developer and 20 parts by weight of pregnenolone as a decolorizer were used. The microcapsules were dispersed in water at a concentration of 8 wt % to prepare ink.

This ink was used in a ink-jet printer equipped with a piezoelectric element (MJ800C manufactured by Epson Corp.) to print on a paper sheet of A4 size. After the printing, a thermal bar was passed above the paper to decolor the printed information. When the recycled paper was stored at 60° C. for 30 hours, the printed information did not appear again, which revealed that the recycled paper sheet had a good storage stability. After the paper sheet was printed again, the printed surface was irradiated with light at 5000 lux for 300 hours. In this case, decrease in printing density was not higher than 10%.

Example 6

Two parts by weight of a colored composition consisting of PSD-150 (available from Nippon Soda Co. Ltd.) as a color former and 2,3,4,4'-tetrahydroxybenzophenone as a developer at a ratio of 1 to 1, seven parts by weight of D-glucose as a decolorizer, three parts by weight of gelatin as a binder, and small amounts of isopropyl alcohol and a mildew inhibitor were added to water to prepare ink with a solid content of 10%. The color of the ink was black.

A paper sheet was printed with the ink with an ink-jet printer, and then the printed paper sheet was dried. When the paper sheet was heated by means of a thermal printer head (TPH) at a power of 0.35 mJ/dot or more, the printed information was able to be decolored. The decolored state was kept for 1000 hours at 40° C. without any change.

Examples 7 to 11

In the following Examples 7 to 11, 4.5 μm-thick PET film back-coated with thermosetting silicone-acrylic resin at a thickness of about 0.2 μm was used as a sheet substrate to prepare a printing sheet and a decoloring sheet. Printing and decoloring were carried out by using a thermal printer head with a pixel density of 8 dot/mm at a recording velocity of 10 ms/L.

Example 7

One part by weight of Crystal Violet lactone (CVL) as a color former, one part by weight of propyl gallate as a developer, 15 parts by weight of wax as a thermal transferring agent and 3 parts by weight of polystyrene as a binder resin were mixed followed by thermally melting to prepare an ink composition, and then the melt was applied on a surface of a sheet substrate with a bar coater at a thickness of about 2 μm to prepare a printing sheet.

One part by weight of 1,2-cyclohexanediol and one part by weight of methyl cholate as a decolorizer were mixed followed by thermally melting to prepare a decolorizer composition, and then the melt was applied on a surface of another sheet substrate by a bar coater at a thickness of about 3 μm to prepare a decoloring sheet.

Figure 10:
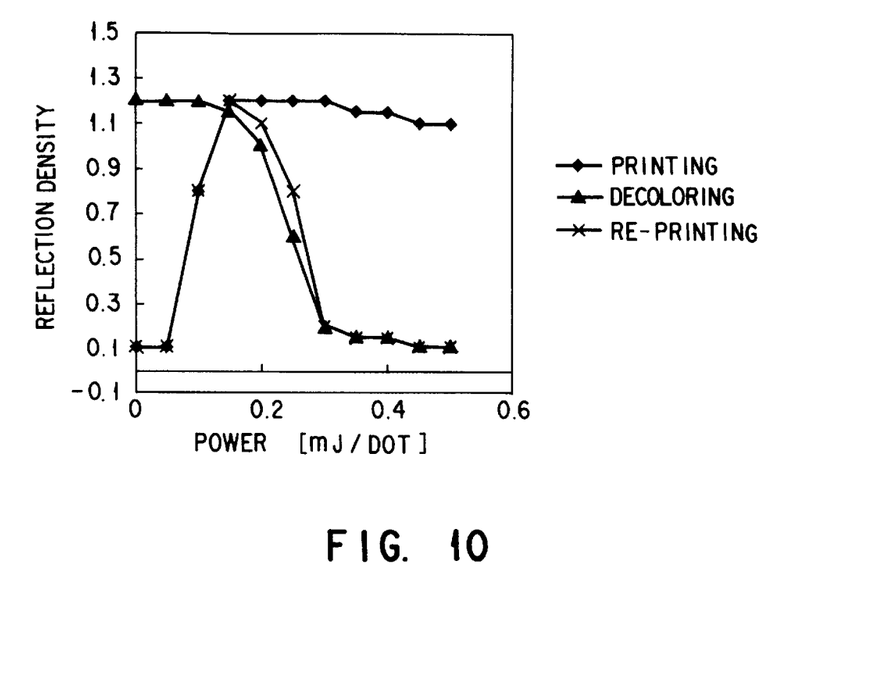
FIG. 10 is a graph showing a relationship between the TPH power and the refractive density obtained in Example 7 of the present invention.

Printing, decoloring and re-printing were carried out in the following manner with changing a TPH power, during which the reflection densities of a paper sheet were measured. The results are shown in FIG. 10.

When the printing sheet was put on a paper sheet and the ink composition was thermally transferred on the paper sheet by means of TPH, printing was effected stably at a power of 0.15 mJ/dot or more.

When the decoloring sheet was put on the printed paper sheet and the decolorizer composition was thermally transferred on the paper sheet by means of TPH, decoloring was effected at a power of 0.3 mJ/dot or more. This decolored state was maintained even for longer than 300 hours at 40° C.

When the printing sheet was put on the decolored paper sheet and the ink composition was thermally transferred again on the paper sheet by means of TPH, re-printing was effected at a power in the range of 0.15 to 0.2 mJ/dot, but re-printing was not able to be effected at a power of 0.3 mJ/dot or more.

Example 8

One part by weight of CVL as a color former, one part by weight of 2,4,4'-trihydroxybenzophenone as a developer, five parts by weight of metylandrostenediol as a reversible decolorizer, five parts by weight of 1-docosanol as a phase-separation accelerator and three parts by weight of styrene-methacrylic acid copolymer as a binder were mixed followed by thermally melted to prepare an ink composition, and then the melt was applied on a surface of a sheet substrate by means of a bar coater at a thickness of 2 μm to prepare a printing sheet. A decoloring sheet was prepared in a similar manner to that of the example 7.

Figure 11:
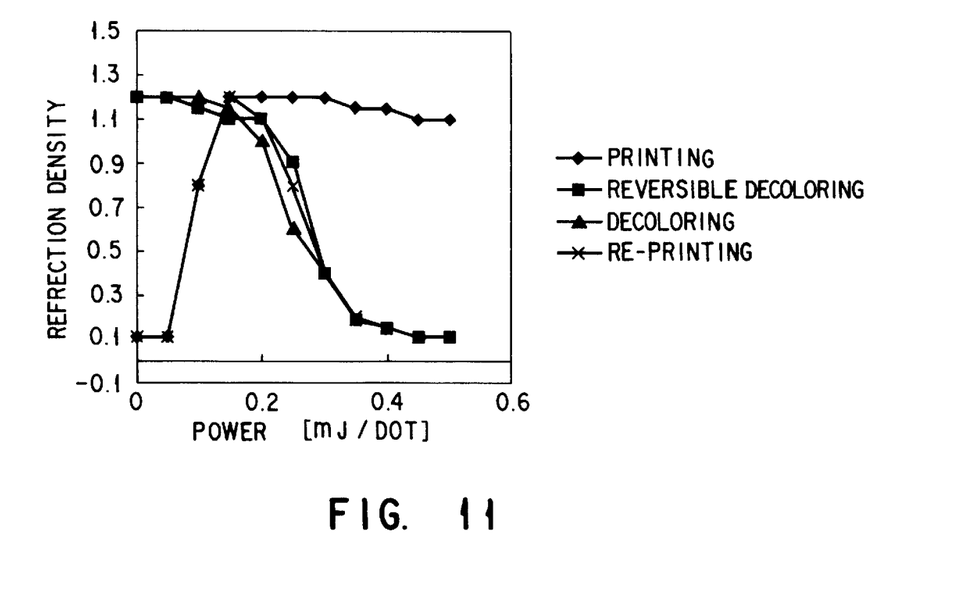
FIG. 11 is a graph showing a relationship between the TPH power and the reflection density obtained in Example 8 of the present invention.

Printing, reversible decoloring, complete decoloring and re-printing were carried out in the following manner with changing a TPH power, during which reflection densities of a paper sheet were measured. The results are shown in FIG. 11.

When the printing sheet was put on a paper sheet and the ink composition was thermally transferred on the paper sheet by means of TPH, printing was effected stably at a power of 0.15 mJ/dot or more.

When the printed portion on the paper sheet was heated by means of TPH, the printed portion was decolored at a power of 0.35 mJ/dot or more. When the decolored paper sheet was left at room temperature, the printed characters were restored to the originally printed state after 72 hours had passed.

When the decoloring sheet was put on the printed paper sheet and the decolorizer composition was thermally transferred on the paper sheet by means of TPH, decoloring was effected at a power of 0.35 mJ/dot or more. This decolored state was maintained even for longer than 1000 hours at 60° C. without any change.

When the printing sheet was put on the decolored paper sheet and the ink composition was thermally transferred again on the paper sheet by means of TPH, re-printing was able to be effected at a power in the range of 0.15 to 0.25 mJ/dot, but re-printing was not able to be effected at a power of 0.35 mJ/dot or more.

Example 9

One part by weight of ETAC (available from Yamada Chemical Co. Ltd.) as a color former, one part by weight of 2,4,4'-trihydroxybenzophenone as a developer, five parts by weight of methyl lithocholate as a compatible decolorizer and three parts by weight of polystyrene as a binder were mixed at a temperature where methyl lithocholate is not melted to prepare an ink composition, and then the ink composition was applied on a surface of a sheet substrate by means of a bar-coater at a thickness of 2 μm to prepare a printing sheet.

β-Sitosterol as a reversible decolorizer and mixed alcohols containing mainly myricyl alcohol as a phase-separation accelerator were mixed at a ratio of 2 to 1 by weight followed by thermally melting to prepare a decolorizer composition, and then the melt was applied on a surface of another sheet substrate at a thickness of 2 μm by means of a bar-coater to prepare a decoloring sheet.

Figure 12:
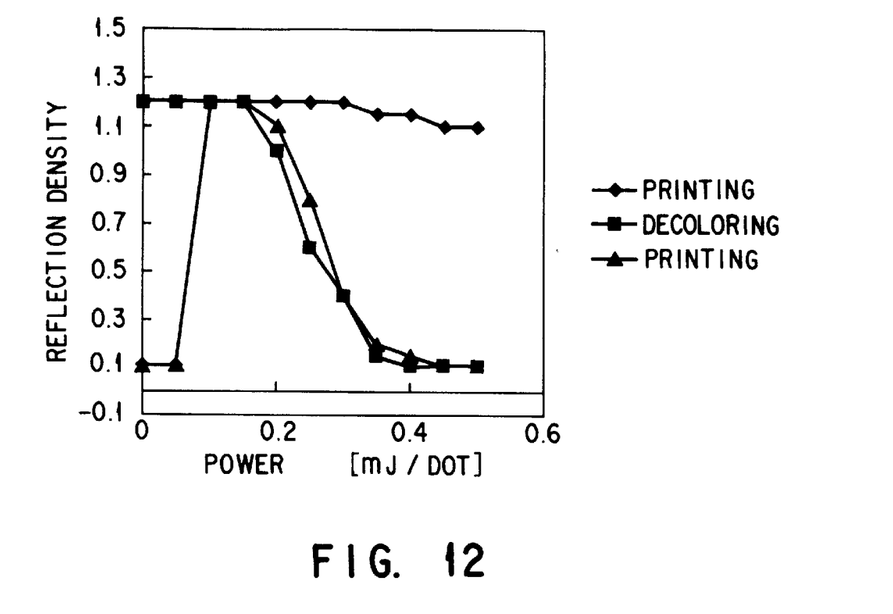
FIG. 12 is a graph showing a relationship between the TPH power and the reflection density obtained in Example 9 of the present invention.

Printing, decoloring and re-printing were carried out in the following manner with changing a TPH power, during which the reflection densities of the paper sheet were measured. The results are shown in FIG. 12.

When the printing sheet was put on a paper sheet and the ink composition was thermally transferred on the paper sheet, printing was effected stably at a power of 0.10 mJ/dot or more. When the printed portion of the paper sheet was heated by means of TPH, it was not able to decolor the printed characters.

When the decoloring sheet was put on the printed paper sheet and the decolorizer composition was thermally transferred on the paper sheet by means of TPH, decoloring was effected at a power of 0.3 mJ/dot or more. The decolored state was not changed even after 300 hours had elapsed at 40° C.

When the printing sheet was put on the decolored paper sheet and the ink composition was thermally transferred again on the paper sheet, re-printing was effected at a power in the range of 0.15 to 0.2 mJ/dot. However, re-printing was not effected at a power of 0.3 mJ/dot or more.

Example 10

One part by weight of RED 40 (available from Yamada Chemical Co., Ltd.) as a color former, one part by weight of 2,3,4,4'-tetrahydroxybenzophenone as a developer and 10 parts by weight of 1,2-cyclohexanediol as a phase-separation inhibiting decolorizer were mixed by melting, and then the solid mixture was pulverized into fine powder with a particle size of 10 $\mu$m or less.

On the other hand, one part by weight of RED 40 as a color former, 2,3,4,4'-tetrahydroxybenzophenone as a developer and 10 part by weight of cholesterol as a reversible decolorizer were mixed by melting, and then the solid mixture was pulverized into fine powder with a particle size of 10 $\mu$m or less.

These two kinds of powder were mixed at a ratio of 1 to 1 by weight and the mixture was dispersed in an aqueous solution containing 5% gelatin at a solid content of 20% to prepare ink. The ink was then applied on a surface of a sheet substrate with a coating weight of about 3 g/m$^2$ by means of a bar-coater to prepare a printing sheet. In this example, no decoloring sheet was used.

Figure 13:
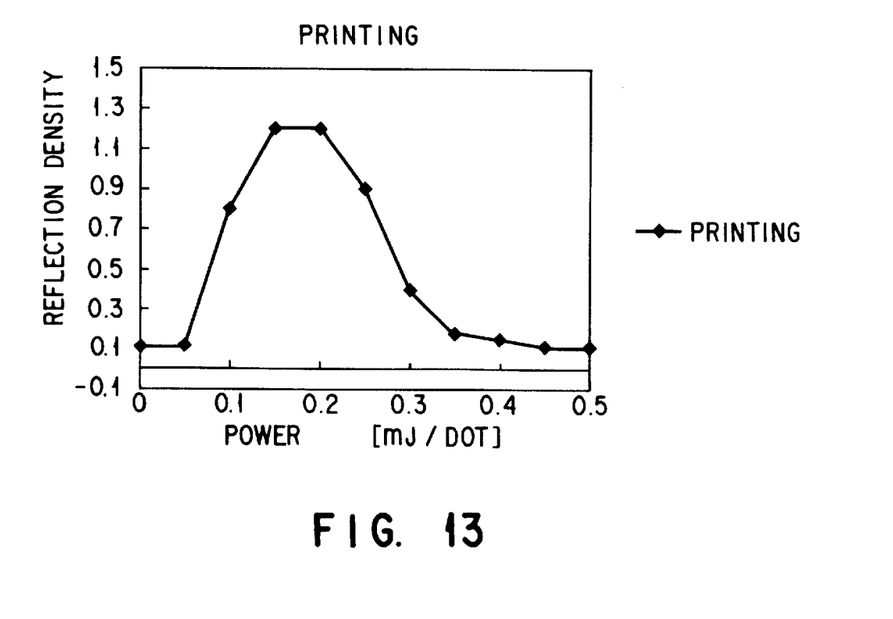
FIG. 13 is a graph showing a relationship between the TPH power and the reflection density obtained in Example 10 of the present invention.

FIG. 13 shows a relationship between the TPH power and the reflection density. When the printing sheet was put on a paper sheet and the ink composition was thermally transferred on the paper sheet by means of TPH, printing was effected at a power in the range of 0.10 to 0.3 mJ/dot, but printing was not effected at a power exceeding 0.3 mJ/dot.

When the printed portion of the printed paper was heated by means of TPH, it was unable to decolor the printed portion at a power in the range of 0.10 to 0.3 mJ/dot, but it was able to decolor the printed portion at a power exceeding 0.3 mJ/dot. The decolored state was maintained without any change for 300 hours at 40° C.

Example 11

One part by weight of CVL as a color former, one part by weight of propyl gallate as a developer and 10 parts by weight of choresterol as a reversible decolorizer were melted to prepare a composition. Using a composition, microcapsules with a gelatin shell were prepared. Three parts by weight of the microcapsules and one part by weight of wax as a thermal transferring agent were mixed and the mixture was applied on a sheet substrate by means of a hot-melt coater to prepare a printing sheet.

The printing sheet was put on a paper sheet and then the ink composition was thermally transferred on the paper sheet at a power of 0.15 mJ/dot by means of TPH to print such a phrase as "STORAGE POSSIBLY IMPROPER". The printed paper was heated at 60° C. to decolor the characters temporarily.

When the decolored paper was stored in a refrigerator at 10° C., the printed characters did not appear even after 240 hours had passed. However, when the decolored paper was left in a room at 25° C., the printed characters appeared after 10 hours had passed. Similarly, in the condition of 35° C., the characters appeared after two hours had passed. Therefore, the ink of the present invention can be applicable as a thermal history sensor in the use such as quality control of fresh foods.

A temperature at which printing with an ink of the present invention is restored, after it is printed and then decolored temporarily, is controllable by selecting material having a proper glass transition point. Glass transition point Tg and melting point Tm of typical reversible decolorizers are shown in Table 1. Moreover, coloring speed of ink in the vicinity of the above mentioned temperatures were controlled by addition of a phase-separation accelerator or selection of a proper developer.

| No. | Decolorizer | Tg | Tm |
|---|---|---|---|
| 1 | 1,2:5,6-Diisopropylidene-D-Mannitol | 2° C. | 106° C. |
| 2 | Pregrenolone Acetate | 15° C. | 140° C. |
| 3 | Δ-Androstene-3, 17-dione | 22° C. | 130° C. |
| 4 | Cholesterol | 28° C. | 137° C. |
| 5 | Lanosterol | 33° C. | 131° C. |
| 6 | 5α-Pregnan-3β-ol-20-one | 37° C. | 182° C. |
| 7 | Pregnenolone | 44° C. | 183° C. |
| 8 | Estradiol Benzoate | 50° C. | 188° C. |
| 9 | 5α-Pregnan-3β, 17-diol diacetate | 53° C. | 196° C. |
| 10 | Methylandrostendiol | 65° C. | 197° C. |
| 11 | Heckogenin | 80° C. | 250° C. |
| 12 | Rockogenin | 92° C. | 201° C. |

Example 12

One part by weight of CVL as a color former, one part by weight of propyl gallate as a developer, 10 parts by weight of cholesterol as a reversible decolorizer, three parts by weight of wax as a thermal transferring agent, five parts by weight of polystyrene as a binder, and small amounts of hydrophobic quartz filler in the form of ultra-fine powder and an antistatic agent were melted and then solidified. The solid product was crushed and further pulverized into fine particles with an average size of 10 $\mu$m to prepare toner. A decoloring sheet was prepared in a similar manner to that of the example 7.

The toner was fed to a copy machine (FC210 manufactured by Cannon Inc.) and characters were copied on a paper sheet. They were fixed stably.

When the decoloring sheet was put on the copied paper and then the decolorizer was thermally transferred by means of THP, decoloring was effected at a power of 0.3 mJ/dot or more. The decolored state was unchanged even after 300 hours had elapsed at 40° C.

Example 13

One part by weight of ETAC (made by Yamada Chemical Co., Ltd.) as a color former, one part by weight of 2,4,4'-trihydroxybenzophenone as a developer, 10 parts by weight of heckogenin as a reversible decolorizer, three parts by weight of mixed alcohols rich in myricyl alcohol as a phase-separation accelerator, five parts by weight of styrene-methacrylic acid copolymer as a binder, and small amounts of hydrophobic quartz filler in the form of ultra-fine powder and an antistatic agent were melted and then solidified. The solid product was crushed and further pulverized into fine particles with an average size of 10 $\mu$m to prepare toner. A decoloring sheet was prepared in a similar manner to that of the example 7.

The toner was fed into a copy machine (FC210 manufactured by Canon Inc.) and characters were copied on a paper sheet. The characters were fixed on the paper sheet stably.

When the copied portion of the paper sheet was heated by means of TPH at a power of 0.35 mJ/dot or more, it was able to decolor the copied characters. The decolored characters did not appear at room temperature, but they appeared at 40° C. after 3 weeks had passed, and at 135° C. at an elapsed time of 0.2 seconds.

When the decoloring sheet was put on the copied paper and then the decolorizer was thermally transferred by means of THP, decoloring was effected at a power of 0.35 mJ/dot or more. The decolored state was unchanged even after 1000 hours had elapsed at 60° C.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. Decolorizable ink consisting of an ink composition dispersed in a solvent, said ink composition comprising a color former, a developer and a decolorizer, wherein said color former and developer are in a colored state by interaction between them and said decolorizer has a property to dissolve preferentially one of said color former and developer when the ink composition is melted, and wherein said decolorizer is selected from the group consisting of cholic acid, lithocholic acid, testosterone, cortisone and their derivatives.

2. The decolorizable ink according to claim 1, wherein said developer is contained in an amount of 0.1 to 10 parts by weight relative to one part by weight of said color former.

3. The decolorizable ink according to claim 1, wherein said decolorizer is contained in an amount of 1 to 200 parts by weight relative to one part by weight of said color former.

4. The decolorizable ink according to claim 1, wherein said solvent is water.

5. The decolorizable ink according to claim 1, wherein the ink composition is dispersed in the solvent in the form of microcapsules.

6. The decolorizable ink according to claim 1, wherein a concentration of the ink composition in the solvent is in the range of 0.1 to 10 wt %.

* * * * *